Oct. 5, 1926.
A. FLOCCHINI
1,601,951
DIRK ATTACHMENT FOR PLOWS
Filed Jan. 2, 1926
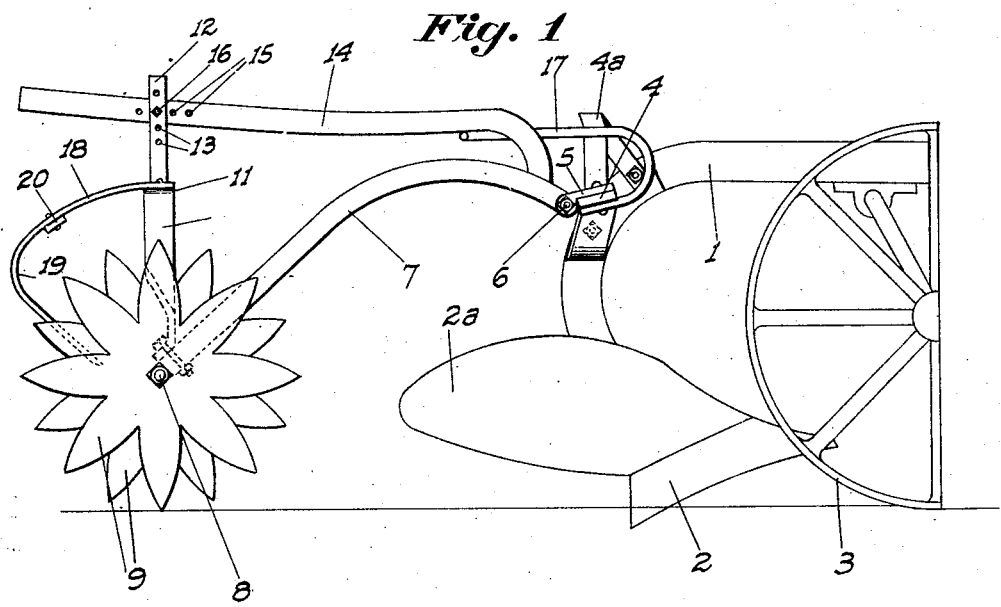
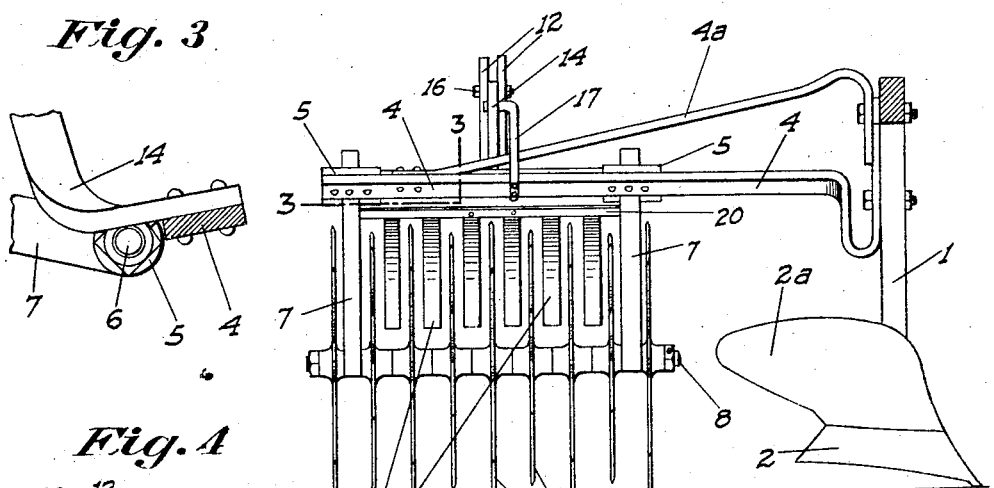
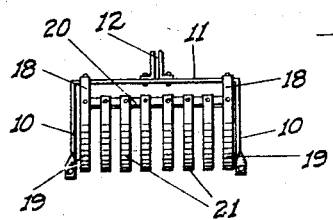
INVENTOR
A. Flocchini
BY
ATTORNEY Patented Oct. 5, 1926.

1,601,951

UNITED STATES PATENT OFFICE.

AMATO FLOCCHINI, OF ALTON, CALIFORNIA.

DISK ATTACHMENT FOR PLOWS.

Application filed January 2, 1926. Serial No. 78,814.

This invention relates to improvements in agricultural implements, my principal object being to provide a disk attachment to be applied to ordinary plows so arranged that as fast as the plow turns over the ground, the disk attachment will act on and thoroughly pulverize the turned furrow. By this means plowing and clod breaking and ground leveling operations are carried out at the same time. The attachment is also arranged to be adjusted so as to be operated at different depths relative to the plow, to suit different conditions of operation, while normally moving up and down as a unit with the plow.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side elevation of the attachment as applied to a plow of standard construction.

Fig. 2 is a front end view of the attachment.

Fig. 3 is a fragmentary cross section on the line 3—3 of Fig. 2.

Fig. 4 is a rear view of the disk supporting frame and fixed tooth structure detached.

Referring now more particularly to the characters of reference on the drawings, the numeral 1 denotes a plow standard or beam having a plow share 2 of common form on its lower end and supported ahead of the share by wheels 3.

My attachment for such a plow comprises a rigid horizontal and transversely extending beam 4 adapted at one end to be rigidly secured to the standard 1 on that side of said standard beyond which the moldboard 2ª of the plow projects, and to extend laterally beyond said moldboard. A brace 4ª for said beam is secured to the standard 1 in connection with the beam 4 but above the latter, and extends thence toward the opposite end of said beam.

Fixed on the beam 4 at spaced points are brackets or hangers 5 to form bearings for the pins 6 of bars 7 which extend lengthwise of the line of travel of the plow and rearwardly thereof.

The rear ends of these bars form spaced bearings for a shaft 8 on which are fixed a number of ground breaking implements in the form of radially toothed members 9 set in transversely spaced and staggered relation to each other.

Arms 10 are fixed at their ends onto the beams 7 near the lower ends of the latter and project upwardly from the members 9 to a certain distance thereabove, being connected at their upper ends by a horizontal bar 11. These arms 10 and bar 11 form a unitary yoke.

Transversely spaced straps 12 project upwardly from the bar 11 adjacent the center thereof, said straps having a plurality of vertically spaced holes 13 therethrough.

A rigid longitudinal bar 14 extends from between said straps forwardly to a rigid connection with the main frame beam 4. This bar has a plurality of longitudinally spaced holes 15 to cooperate with the holes 13, a bolt 16 being passed through any alined pair of such holes 13 and 15.

In this manner it will be seen that the vertical level of the ground working elements 9 may be altered at will relative to the setting of the plow. A rigid bar 17 is secured at one end to the beam 4 and extends rearwardly for a certain distance, being then bent transversely to pass under the bar 14 and serve as an auxiliary support and brace therefor.

Fixed on the bar 11 at its ends and extending rearwardly therefrom is a pair of straps 18 whose lower ends are formed as teeth or fingers 19 which curve forwardly to project between the outermost pairs of the elements 9. Adjacent the junction of the straps 18 with the fingers 19 a transverse bar 20 extends between said straps and is secured thereto. Teeth or fingers 21 depend from this bar, said fingers being parallel to the fingers 19 and projecting between those adjacent elements 9 which lie inwardly of the fingers 19.

The ground working members 9 are disposed relative to the moldboard so that dirt dug up by the plow and turned over by the moldboard in the usual manner is immediately acted on and thoroughly disked by the members 9. The fingers 19 and 21 act to prevent packing of the dirt between said members 9 and also aid in breaking up the clods.

While I preferably use ground working members of the type shown other forms to give the same result can obviously be used.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

An attachment for a mold board plow having a standard comprising a rigid beam to extend transversely from one side of the standard and adapted to be secured thereto, bars pivoted onto the beam and projecting rearwardly therefrom, ground working elements supported by the bars at their rear ends, and means for enabling the level of said elements relative to the plow to be altered at will; said means comprising a yoke secured to the bars and extending across and above the elements, a rigid bar secured onto the beam and extending rearwardly of the yoke, and vertically adjustable connection means between said yoke and rigid bar.

In testimony whereof I affix my signature.

AMATO FLOCCHINI.